United States Patent [19]

Daniels et al.

[11] 4,217,496
[45] Aug. 12, 1980

[54] PORTABLE INSTRUMENT FOR MEASURING NEUTRON ENERGY SPECTRA AND NEUTRON DOSE IN A MIXED N-γ FIELD

[75] Inventors: Charles J. Daniels, Gaithersburg; Jeffrey L. Silberberg, Beltsville, both of Md.

[73] Assignee: The United States of America as represented by the Secretary of Health, Education and Welfare, Washington, D.C.

[21] Appl. No.: 886,465

[22] Filed: Mar. 14, 1978

[51] Int. Cl.² .............................................. G01T 1/20
[52] U.S. Cl. .................................. 250/369; 250/390; 250/392
[58] Field of Search ............ 250/390, 391, 392, 361 R, 250/363 R, 369

[56] References Cited

U.S. PATENT DOCUMENTS

| | | | |
|---|---|---|---|
| 2,795,703 | 6/1957 | Berlman et al. | 250/392 |
| 2,830,189 | 4/1958 | Scherbatskoy | 250/392 |
| 3,898,466 | 8/1975 | Kawashima | 250/390 |

Primary Examiner—Davis L. Willis
Attorney, Agent, or Firm—Browdy and Neimark

[57] ABSTRACT

A portable high-speed neutron spectrometer consisting of an organic scintillator, a true zero-crossing pulse shape discriminator, a 1 MHz conversion-rate multichannel analyzer, an 8-bit microcomputer, and appropriate displays. The device can be used to measure neutron energy spectra and kerma rate in intense n-γ radiation fields in which the neutron energy is from 0.5 to 15 MeV.

14 Claims, 7 Drawing Figures

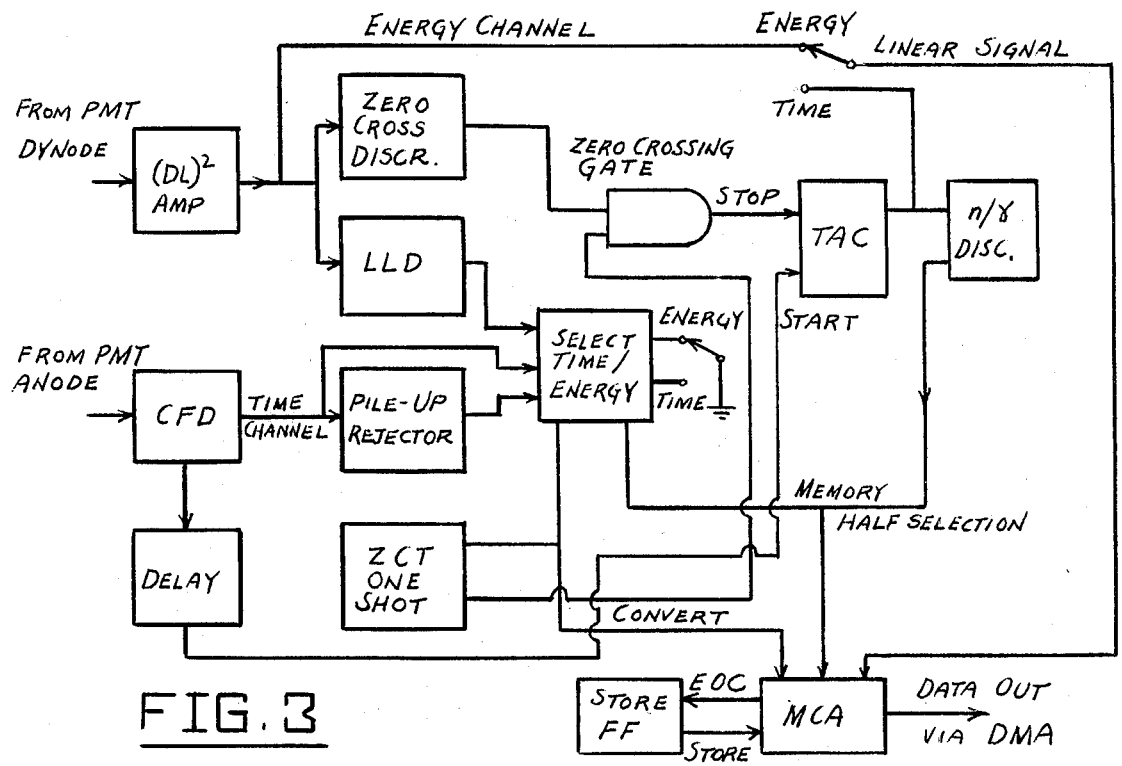
FIG. 3
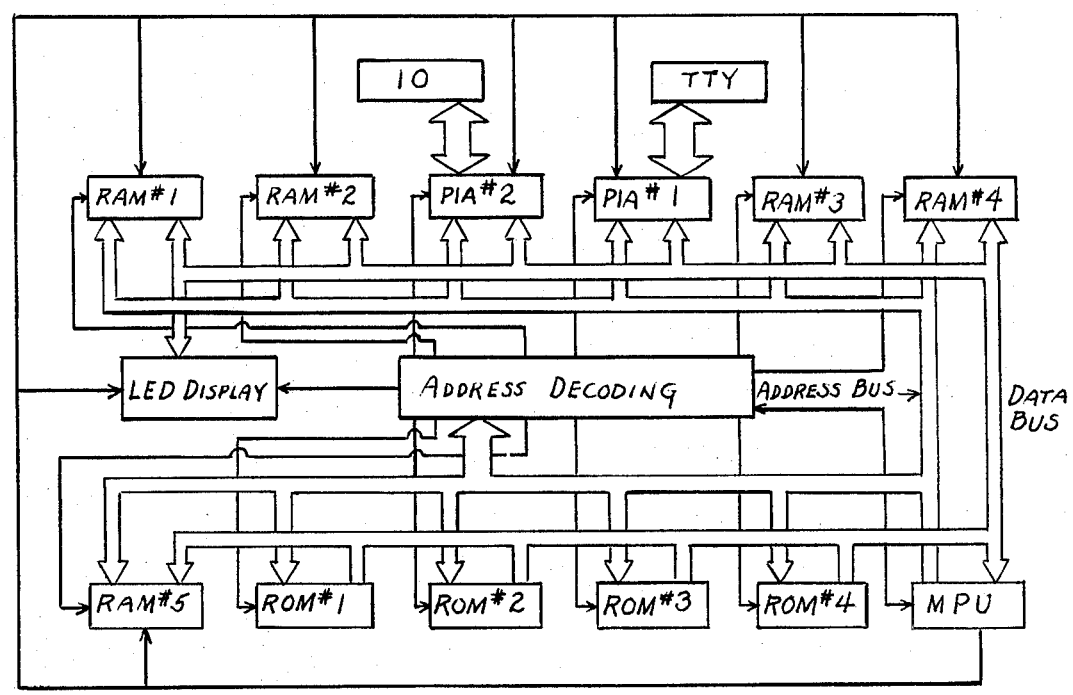
FIG. 5 Microcomputer Organization

Microcomputer Memory Map

PORTABLE INSTRUMENT FOR MEASURING NEUTRON ENERGY SPECTRA AND NEUTRON DOSE IN A MIXED N-γ FIELD

FIELD OF THE INVENTION

This invention relates to instruments for measuring neutron energy spectra and neutron kerma rate, and more particularly to a portable instrument for use in intense, mixed n-γ radiation fields and which is of the type employing a scintillator and an associated photomultiplier tube for detecting the radiant energy. The terms kerma and kerma rate as used hereinafter are conventional terms defined by the International Commission on Radiation Units and Measurements, *ICRU Report* 19, "Radiation Quantities and Units", 7910 Woodmont Avenue, Washington, D.C. 20014, pages 8, 9 (July 1, 1971).

BACKGROUND OF THE INVENTION

The fast neutron contamination associated with photon beams of high-energy medical accelerators is a matter of concern to the health community because this radiation may contribute to a significant whole-body dosage thereof to a patient undergoing therapy.

Recently there has been a trend toward the use of higher energy electron linear accelerators as X-ray sources for radiotherapy. When operated at 25 MeV in the X-ray mode, a significant fraction of the photons are capable of initiating n-γ reactions. Neutron dose rates of approximately 0.5% of the X-ray dose rate at a distance of 1 m from the target of a 25 MeV medical accelerator have been reported (1). Although the neutron dose is small, the rem dose may be biologically significant when considering the effect on the eyes (1) and other organs of the body.

In order to quantify the neutron contamination for evaluation of its biological effects, it is necessary to determine its energy spectrum. There are three major problems associated with the determination of neutron spectra from medical linacs: (a) the radiation field is a mixture of a high-intensity gamma-ray field and a low intensity neutron field; (b) the machine operates in a pulsed mode, causing high flux rates for very short periods, typically less than 2μs; and (c) the neutron spectrum must be determined from the pulse-height distribution of the secondary particles (protons). Once the energy spectrum of the neutrons has been determined, the resultant tissue kerma rate may be calculated.

In the past, neutron spectrometry required bulky nuclear instrumentation and a minicomputer to determine the neutron energy spectrum. There is a significant need for a portable instrument capable of detecting, computing and displaying neutron spectra and kerma rate in a mixed field of radiation, and which is physically suitable for utilization at a wide range of locations or sites where such radiation is suspected to be present.

A preliminary search of the prior patented art revealed the following prior U.S. patents of interest in connection with the present invention:
Berlman et al, U.S. Pat. No. 2,795,703
Scherbatskoy, U.S. Pat. No. 2,830,189
Love et al, U.S. Pat. No. 3,129,329
Sleege, U.S. Pat. No. 3,519,822
Kawashima, U.S. Pat. No. 3,898,466
Kamburov et al, U.S. Pat. No. 3,056,725

Also of interest are the following publications, to which reference is made in the course of the description of the present invention:

1. R. M. Wilenzich, P. R. Almond, G. D. Oliver, Jr., and C. D. DeAlmeida, "Measurements of Fast Neutrons Produced by High-Energy X-Ray Beams of Medical Electron Accelerators", Phy. Med. Biol. 18 (1973) 396.
2. M. L. Roush, M. A. Wilson and W. F. Hornyak, "Pulse Shape Discrimination", Nucl. Instr. and Meth. 31 (1964) 112.
3. D. W. Glasgow, D. E. Velkley, J. D. Brandenberger, and M. T. McEllistrem, "Pulse-Shape Discrimination for Wide Dynamic Range Neutron Scattering Experiments", Nucl. Inst. and Meth. 114 (1974) 535.
4. I. J. Taylor and J. Kalyna, "A High Speed Pulse Shape Discriminator", Nucl. Inst. and Meth. 88 (1970) 267.
5. Mike Wiles and Andre Felix, MCM6830L7 *MIKBUG/MINIBUG ROM*, Engineering Note 100, Motorola, Inc. 1975.
6. H. W. Broek and C. E. Anderson, "The Stilbene Scintillation Crystal as a Spectrometer for Continuous Fast-Neutron Spectra", Rev. Sci. Instrum. 10 (1960) 1063.
7. D. W. Jones and M. Elaine Toms, "A Neutron Spectrometer Using Organic Scintillators", NRL Report 7324, Washington, D.C. 1971.
8. J. J. Ritts, M. Solomito and P. N. Stevens, "Calculation of Neutron Fluence-to-Kerma Factors for the Human Body", Nucl. Appl. and Tech. 1 (1969) 89.
9. Charles J. Daniels, "A Portable Scintillation Counter with Pulse-Shape Discrimination for Measurement of Fast Neutron Spectra and Dose in a Mixed n-γ Field", M. S. Thesis, Physics Department, University of Maryland, Mar. 29, 1977.
10. Jeffrey L. Silberberg, "Design of a Microcomputer Processing Subsystem for a Portable Neutron Spectrometer/Kerma-Rate Meter", M. S. Thesis, Electrical Engineering Department, University of Maryland, May 11, 1977.
11. Jeffrey L. Silberberg, "A Microprocessor System for a Portable Neutron Spectrometer/Kerma-Rate Meter", IEEE Transactions on Nuclear Science, Vol. NS-24, No. 1, Feb. 1977.

SUMMARY OF THE INVENTION

Accordingly, a main object of the invention is to provide a novel and improved portable high-speed neutron spectrometer and kerma rate measuring device which overcomes the deficiencies and disadvantages of the previously employed prior art devices.

A further object of the invention is to provide an improved neutron spectrometer system which does not involve bulky components and hence is portable, and which can be employed to accurately measure neutron energy spectra and kerma rate in intense, mixed n-γ radiation fields.

A still further object of the invention is to provide a novel and improved neutron spectrometric instrument employing a scintillation counter with pulse shape discrimination for measurement of fast neutron spectra and dose in a mixed n-γ field, and further employing a novel and improved multichannel analyzer and a microcomputer.

The instrument consists of four major components: (1) an organic scintillation detector; (2) a pulse-shape discriminator (PSD); (3) a multichannel analyzer (MCA); and (4) a microcomputer (FIG. 1). The radiation field interacts with the organic scintillator, which is optically coupled to a photomultiplier tube (PMT). Current pulses from the tube are sent to the PSD. The PSD discriminates between recoil protons (produced by neutrons) and recoil electrons (produced by gamma rays) and places the pulse-height distribution of the recoil protons in a section of the MCA memory. The microcomputer calculates the neutron spectrum and subsequently the kerma rate from the pulse-height distribution of the recoil protons, using stored values of parameters necessary for the calculation.

BRIEF DESCRIPTION OF THE DRAWINGS

Further objects and advantages of the invention will become apparent from the following description and claims, and from the accompanying drawings, wherein:

FIG. 3 is a block diagram of the pulse-shape discrimination circuit employed in the system of FIG. 1.

FIG. 5 is a block diagram showing the organization of the microcomputer employed in the system of FIG. 1.

DESCRIPTION OF A PREFERRED EMBODIMENT

SCINTILLATION DETECTOR

Figure 2:
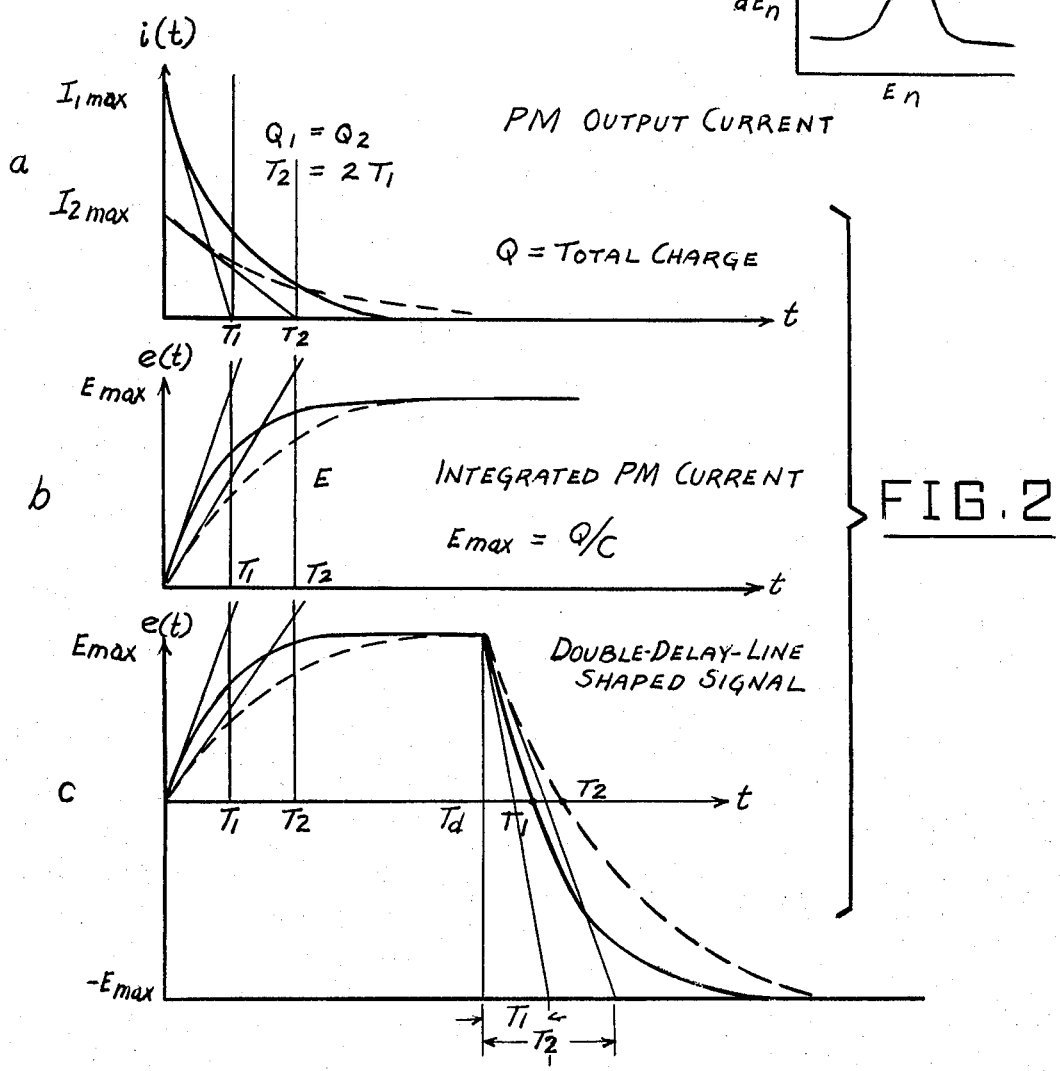
FIG. 2 illustrates graphs showing the differences in the exponential scintillation decay signals which allow the pulse discrimination portion of the system to distinguish between the amount of slow decay components associated with an electron and a proton in an organic scintillator as used in the system of FIG. 1.

The properties that make organic scintillators useful for pulse shape discrimination are well known. When stilbene is used, the light pulses from the detector may be characterized by an initial fast rise, of the order of a few nanoseconds, and a decay composed of a fast and a slow component. Assuming the net current arriving at the photomultiplier dynode is produced by a scintillation light pulse with two principal decay constants, the following expression characterizes the PMT current pulse (FIG. 2a):

$$i(t) = I_1(E)\exp(-t/T_1) + I_2(E)\exp(-t/T_2)$$

The values for $I_1$, $I_2$, $T_1$, and $T_2$ may be found in Roush (2). The above-noted equation is set out, in general form, on page 113 of Roush et al (2) as follows:

$$i(t) = A(E)\exp(-t/\alpha) + B(E)\exp(-t/\beta).$$

The values for A, B, α and β which correspond respectively to $I_1$, $I_2$, $T_1$, and $T_2$ are set out on page 124 of Roush et al. (2) as follows:

Table 1

| Scintillator and pulse characteristics. | | | | |
|---|---|---|---|---|
| Scintillator | A | α (nsec) | B | β (nsec) |
| Stilbene (e−) | 0.933 | 5.6 | 0.0616 | 49 |
| (p+) | 0.779 | 6.0 | 0.0545 | 67 |

The pulse due to an electron has a larger fast component than the pulse due to a proton for the same total light output. Discrimination between pulses induced by neutrons and gammas depends on this difference in pulse shape.

The use of high-efficiency scintillators and high quantum-efficiency, low time-dispersion PMTs improves pulse-shape discrimination over wide dynamic ranges.

Figure 1:
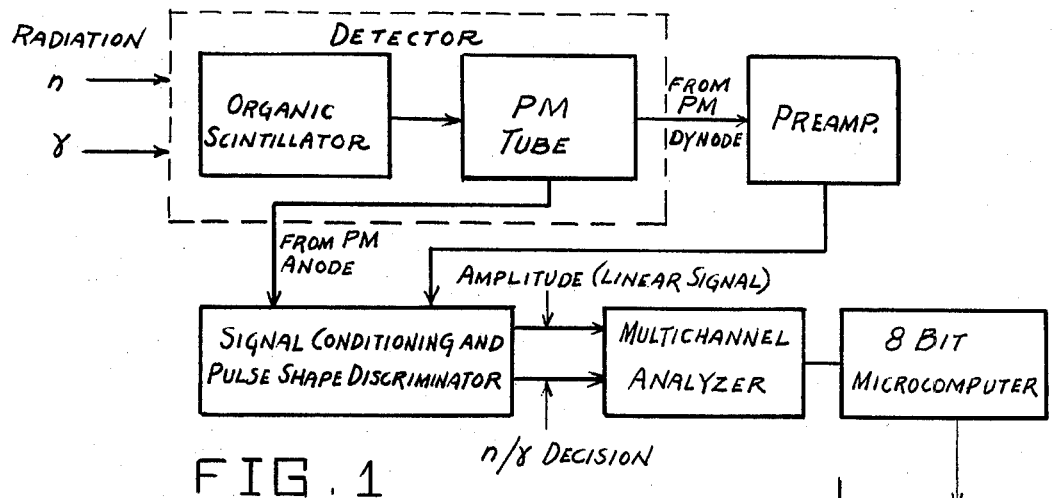
FIG. 1 is a block diagram of a neutron spectrometer system according to the present invention.

A typical detector employed in the system of FIG. 1 consists of a 1.5"×1.5" cylindrical stilbene crystal with light-reflecting MgO coating material mounted on a 14-stage PMT (Amperex/Philips 56 AVP). The usual shielding arrangements against external magnetic fields are provided. The tube was selected for its excellent rise time (2 nsec) and small transit-time differences (less than 0.5 nsec).

PULSE SHAPE DISCRIMINATION

The essence of the pulse-shape discrimination technique is the ability of the system to distinguish between the amount of slow-decay components associated with an electron and a proton in an organic scintillator.

When a system is required to operate over a large dynamic range of neutron energies, the best PSD is provided by the zero-crossing method of Alexander and Goulding (3). This technique can be improved further to provide a "true" zero-crossing PSD, as described below.

Zero-crossing PSD functions as follows: pulses from a scintillator-photomultiplier combination (FIG. 2a) are integrated in a preamplifier. The rise times of the integrated signals differ (FIG. 2b), depending upon whether they were produced by recoil electrons or recoil protons. A double delay line amplifier processes the integrated pulses and produces baseline crossover points ($T_1$, $T_2$) that are amplitude-invariant functions of the respective rise times (FIG. 2c). A measurement of the time difference between the anode current pulse and the zero-crossing point of the double differentiated pulse uniquely determines the type of particle. The time $T_1$ is associated with the scintillations caused by the neutrons.

In the "true" zero-crossing PSD, the degradations of n-γ discrimination due to ill-defined crossover characteristics of small pulses (low energy gammas and neutrons) can be largely corrected by increasing the PMT gain. This is possible because a "true" zero-crossing detector is gated to operate only for the duration of the pulse from the linear amplifier; thus, it can operate in the region that normally would be below the noise level, and timing uncertainty is then more closely related to the high-frequency components at the crossover.

Figure 4:
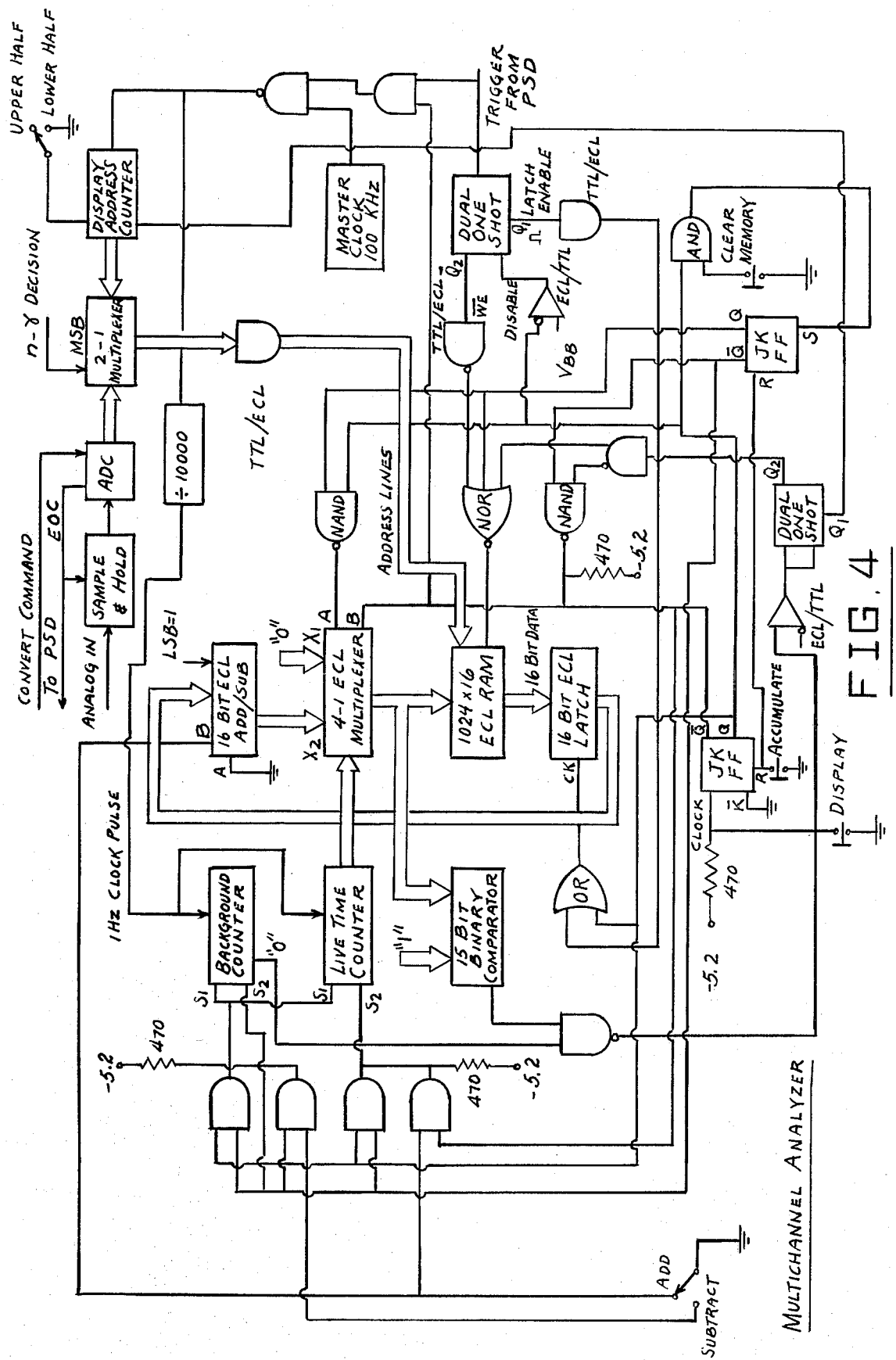
FIG. 4 is a block diagram of the multichannel analyzer circuit employed in the system of FIG. 1.

A block diagram of the PSD circuit is shown in FIG. 3. The input to the double-delay-line amplifier $(DL)^2$ is provided by the PMT 9th dynode and the input to the constant fraction discriminator is from the PMT anode. The zero-crossing discriminator generates a pulse when the output of the $(DL)^2$ amplifier is above a preset, but variable amplitude. A narrow pulse, close to the leading edge of the anode current pulse is generated by the constant-fraction discriminator (CFD), providing a low-walk timing pulse, which is used as a reference. The CFD output is used to generate a signal from the SELECT TIME/ENERGY circuit, the delay circuit, and the pile-up rejection circuit if two anode pulses occur within 1.4 μs, the $(DL)^2$ amplifier pulse duration. The output pulse from the delay circuit provides the start pulse to the time-to-amplitude converter (TAC). The output from the ZCT one-shot is used to inhibit the stop signal to the TAC until a valid linear signal appears at the $(DL)^2$ amplifier output. The amplitude of the pulse from the TAC is directly proportional to the time between the pulse from the delay circuit and the stop pulse. Either the same spectrum from the TAC or the pulse-height distribution from the $(DL)^2$ amplifier may be stored in the MCA, depending on the position of the TIME/ENERGY switch. With the switch in the ENERGY position, if there is no pile-up and the $(DL)^2$ amplifier output exceeds the LLD threshold, a convert pulse, in coincidence with the peak of the linear signal from the $(DL)^2$ amplifier, will be generated and sent to the ADC (FIG. 4). If the switch is in the TIME position and the conditions mentioned above are met, a convert pulse coincident with the peak of the TAC output will be sent to the ADC. The convert pulses are generated in the SELECT TIME/ENERGY circuits by the pulse from the CFD.

Following the TAC is the n-γ discriminator, which generates a pulse if the TAC outpout exceeds a fixed, but adjustable, level. The level is set so that neutron events produce a pulse at the output of the discriminator, routing the recoil-proton pulse-height distribution to the lower half and the recoil-electron pulse-height distribution to the upper half of the MCA memory.

By observing the TAC pulse-height distribution, which is the time spectrum, the n-γ discriminator threshold may be set so that only that portion of the time spectrum attributed to neutrons will be displayed. If the TIME/ENERGY switch is then placed in the ENERGY position, the two recoil-particle pulse-height distributions will be stored in separate halves of the MCA memory.

THE MULTICHANNEL ANALYZER

The multichannel analyzer is in principle equivalent to several pulse-height analyzers with their windows arranged contiguously. The process of assigning the input pulse height to one of many channels is that of analog-to-digital conversion and, in addition, an MCA is usually provided with a means of accumulating the number of events classified in each channel. A display of the total number of events classified in each channel at the completion of an experiment is the pulse-height histogram of all the pulses observed.

Once the input pulse having height $H_i$ has been coded by the Analog-Digital Converter (ADC) into channel i, this classification is recorded by incrementing the location in memory corresponding to channel i. The number of events which have been classified in each channel is stored in this manner as an m-bit binary word.

In this system, which is typical, m is 16 and 512 channels are used to accumulate each pulse-height distribution. The ADC conversion time for 10 bits is 1 μsec, and the memory read-write cycle time is approximately 140 ns.

The MCA schematic diagram is shown in FIG. 4. There are several features incorporated into the MCA to facilitate system operation.

As with most MCA circuits, there is a CLEAR MEMORY switch, an ACCUMULATE switch, a DISPLAY switch and an ADD/SUBTRACT switch. MCA operation is begun by depressing the DISPLAY and the CLEAR MEMORY switch in that order. Placing the ADD/SUBTRACT switch in the ADD position and depressing the ACCUMULATE switch initiates the accumulation of pulse height data. Data is accumulated until the DISPLAY switch is depressed or the maximum count in any one channel reaches $2^{16}-1$. When either of these conditions occurs, the MCA automatically enters the display mode. If background subtraction is desired, the MCA is placed in the display mode, the ADD/SUBTRACT switch is placed in the SUBTRACT position, and the ACCUMULATE switch is depressed. The contents of the appropriate channels will then be decremented instead of incremened. The MCA accumulates data in this mode for a length of time equivalent to the accumulation live time, then automatically returns to the display mode.

In the typical embodiment herein described, all circuitry in the data storage and retrieval section of the MCA (FIG. 4) was constructed using ECL integrated circuits for high-speed operation. The solid-state memory consists of sixteen 1024×1 Fairchild F10415 ECL RAMS connected to form a 1024×16 array.

Once a recoil-proton pulse-height distribution has been gathered in the MCA, the data is copied into the microcomputer for processing.

MICROCOMPUTER

The microcomputer processes recoil-proton pulse-height data into 0.2 MeV neutron-energy bins and displays the neutron spectra calculated from these data up to 20 MeV. Tissue kerma rate is calculated from the energy spectra and displayed in millirads per hour. In addition, simple diagnostic functions permit microcomputer hardware to be tested for proper operation in the field.

Software development constituted a large part of the microcomputer design. Data processing algorithms were adapted to microprocessor assembly language using a floating-point data format that provides sufficient accuracy yet permits memory space to be kept small.

The ease with which a basic system could be implemented was the basis for selection of the Motorola M6800 microprocessor for the system microprocessing unit (MPU). When the selection was made, the M6800 evaluation kit was the least expensive 8-bit processor package to include monitor software in an off-the-shelf ROM (the MC6830L7 MIKBUG). Using the MIKBUG ROM and reference (5), it was possible to mate the evaluation kit with an ASR-33 Teletype (TTY) and begin software development in one day.

A simple organization diagram of the microcomputer is shown in FIG. 5. ROM #4(MIKBUG), RAM #5, and PIA #1 are used for communication with remote terminals and are not essential to the operation of the instrument. A total of 3 K of ROM and 2¼ K of RAM supply sufficient storage for diagnostics, calibration, and data processing. A direct memory access (DMA) interface is used to transfer data into the microcomputer from the MCA. Data is transferred by halting the MPU and closing the CMOS transmission gates between the MCA and the microcomputer address and data lines when the MCA is in the display mode, with transfer timing controlled by the MCA.

Figure 6:
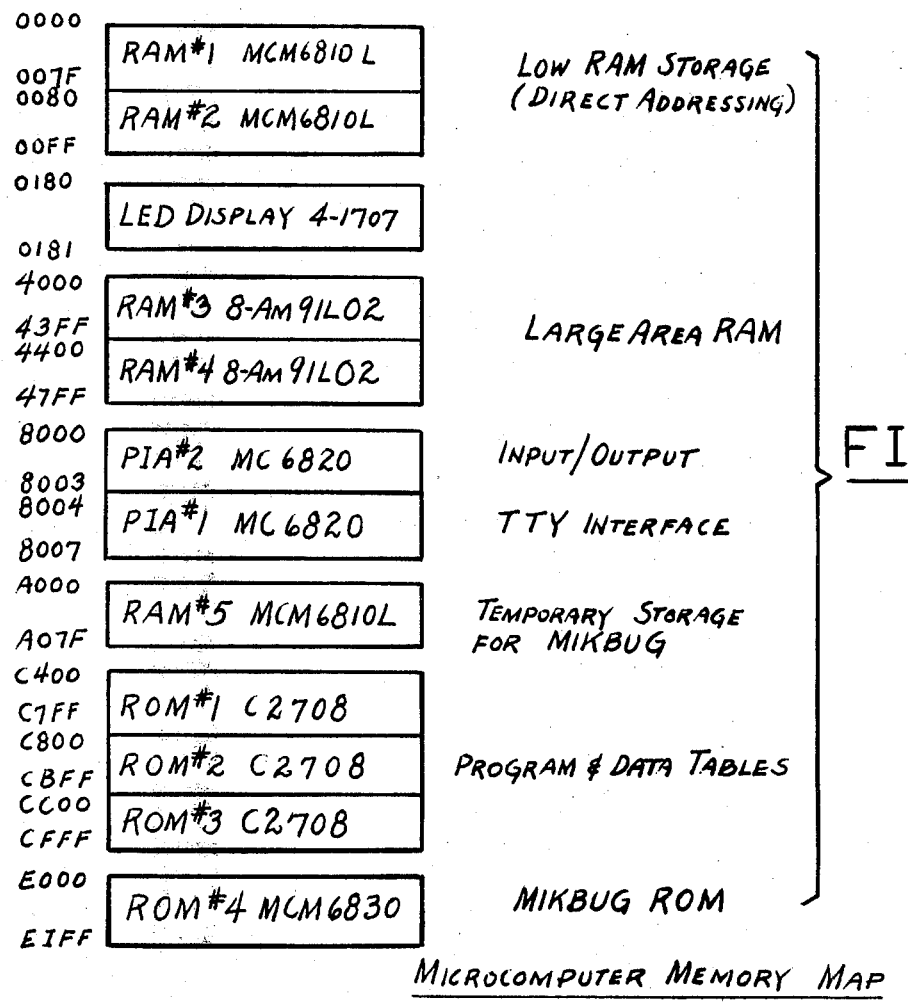
FIG. 6 is a microcomputer memory map indicating the address allocation over the memory space, as well as the components used, in the microcomputer of the system of FIG. 1.

FIG. 6 indicates the address allocation over the memory space, as well as the components used. RAM #1 is used for global and temporary storage, the stack resides in RAM #2, RAM #3 is used to store recoil-proton data, and RAM #4 is used to store recoil-electron data. Software and look-up tables fill three UV-erasable PROMs (Intel C2708). The prototype nature of the system made the use of EPROMs mandatory.

As indicated in FIG. 6, the 4-hexadecimal-digit LED display (I.E.E. 1707s) is configured to appear to the MPU as two memory locations. The LED display is mounted on the microcomputer control panel and is used to output the computed tissue kerma rate in a 3½-digit format, as well as to indicate errors in microcomputer operation. PIA #2 is used to input diagnostic and computational commands from the control panel and to output the computed neutron energy spectrum to a D/A converter (Analog Devices AD7520LD) for display on a Tektronix Model 212 oscilloscope. An active filter on the output of the D/A smooths the display such that linear interpolation is approximated between the discrete data points.

Simple diagnostic routines, initiated from the control panel, test the microcomputer hardware for proper operation. The LED and oscilloscope display functions ae tested as well as RAM and ROM storage, so that hardwae failures can be detected before they can interfere with data processing. Any errors detected in RAM or ROM are indicated by flashing the LED display at a 2-Hz rate.

For the most part, the software development involved adapting the required data processing algorithms to the language of the M6800 microprocessor, using the floating-point data format described below. The algorithms selected for calibrating the system and calculating neutron spectra and kerma rate were chosen for simple execution, in accordance with the limitations of an 8-bit microprocessor. Techniques described in references (6) and (7) were simplified and implemented in M6800 assembly language.

From Brock et al. (6), pages 1064, 1065, it is known that the proton recoil spectrum produced by a given neutron spectrum is $$\frac{dN_p}{dE_p} = N_H \int_{E_p}^{\infty} \sigma(E_n) \frac{dN_n}{dE_n} \frac{dE_n}{E_n},$$

where $E_n$=neutron energy, $E_p$=proton energy, $dN_p/dE_p$=number of neutrons per unit area per unit energy interval incident upon the crystal, $N_H$=number of hydrogen atoms in the crystal, $\sigma(E_n)$=neutron-proton scattering cross section.

The integral is necessary since proton recoils at all angles produce acceptable pulses and hence a recoil whose energy is $E_p$ may be produced by any neutron whose energy is greater than $E_p$.

Differentiating and solving, one obtains $$dN_n/dE_n = -(E_n/N_H\sigma)\left[\frac{d^2N_p}{dE_p^2}\right]_{E_n=E_p}$$

The factor $d^2N_p/dE_p^2$ represents the rate of change of the proton recoil energy spectrum with energy. Because of the nonlinear response of organic scintillation crystals to protons it is necessary to relate the neutron spectrum to the pulse height L. One obtains $$\frac{dN_n}{dE_n} = -\frac{E_n}{N_H\sigma}\left[\frac{dL}{dE_p} \frac{d}{dL}\left(\frac{dL}{dE_p} \frac{dN_p}{dL}\right)\right]_{E_n=E_p},$$

where $dN_p/dL$=number of protons per unit pulse-height interval. The negative sign causes no difficulty since the term in brackets is always negative for an experiment with good statistics.

The foregoing formula ignores second scattering from hydrogen nuclei, wall effects (protons which lose only part of their energy in the crystal), scattering of neutrons by carbon nuclei, coincident events due to high counting rate, statistical broadening, and attenuation of neutron flux in traversing the crystal. The air of the software program can be considered to solve the equation set out immediately above. Instruction set and program listings used in a practical embodiment appears in Silberberg (10) Appendix 4, pages 186–267, which set out all functions performed by the microcomputer.

The data format used for processing purposes consists of eight bits of two's complement exponent plus eight bits of normalized straight-binary mantissa, which provides a dynamic range of $10^{-38}$ to $10^{+38}$ and a resoluion of one part in 256. This floating-point format provides sufficient accuracy for the particular application, while keeping memory size small. Since all calculations required in the determination of neutron spectra and kerma rate use positive numbers only, representation of negative numbers is not required. The bit which would normally indicate sign was used instead to insure sufficient resolution.

Floating-point arithmetic subroutines developed for addition, subtraction, multiplication, and division operate on positive numbers in the floating-point format described above. Error flags are set when a subtraction would produce a negative result or when division by zero is attempted. Although an error is indicated via the LED display in these instances, processing is not interrupted; zero is substituted for negative differences, division by one is substituted for division by zero, and the calculations continue.

Since the input data from the multichannel analyzer is in the form of 16-bit integers, an integer-to-floating-point conversion subroutine is included in the software. Two additional format conversion routines are used in data output: A floating-point-to-binary-coded-decimal (BCD) conversion subroutine prepares data for output to the LED display in a 3½-digit format, while a floating-point-to-10-bit-interger conversion subroutine formats data for output to the D/A converter.

DMA transfer of data into the microcomputer is initiated manually via the COPY DATA switch while the multichannel analyzer is in the display mode. The pulse-height distribution displayed by the MCA is copied into the appropriate RAM: the recoil-proton pulse-height distribution into RAM #3 and the recoil-electron pulse-height distribution into RAM #4.

In order to accommodate the simple algorithms used to correct for the nonlinear response of the scintillation detector with respect to proton energy, it is necessary to set the gain of the $(DL)^2$ amplifier such that the energy-per-channel of both pulse-height distributions is 0.02950 MeV. This is accomplished using a $^{22}$Na gamma-ray source and the CALIBRATE function. When the calibration routine returns a result of 37.4, the system is properly calibrated for accurate computation of neutron energy spectra.

Execution of the COMPUTE commands results in a display of the neutron energy spectrum and tissue kerma rate. The recoil-proton pulse-height distribution, assumed to occupy RAM 190 3 by the program, is first converted from 16-bit integers to floating-point numbers. The acquisition live-time, assumed to occupy channel zero, is then stored in low RAM and channel zero is cleared. The first calculation converts the recoil-proton pulse-height distribution into a recoil-proton energy spectrum by using an approximation of the energy response function of a stilbene scintillator.

Once the system gain has been calibrated, the relationship between pulse-height channels and proton energy channels is fixed, and pulse-height-to-energy-spectrum-conversion can be performed using look-up tables. The recoil-proton pulse-height distribution is rebinned into a 0.2-MeV-per-channel proton energy spectrum from 0.2 to 20.0 MeV. Each proton energy channel has a value assigned to it equal to the area of the pulse-height distribution between $P_j$ and $P_{j+l}$, where $P_j = 0.19 E_j^{1.42}$. $P_j$ is the equivalent electron energy, which is proportional to pulse height, and $E_j$ is the appropriate multiple of 0.2 MeV for proton energy channel j. The entire recoil-proton energy spectrum is then smoothed over groups of three channels to eliminate sharp discontinuities caused by poor statistics or experimental effects. The recoil-proton spectrum is then differentiated, normalized by the live-time, and divided by a stored array to yield the neutron energy spectrum. This array is the product of the efficiency of the detector, the detector area, and the energy-dependent corrections for edge effects and double scattering by carbon and hydrogen. It consists of 100 data points in discrete energy steps of 0.2 MeV from 0.2 to 20.0 MeV.

As stated on pages 154–155 of Silberberg (10), the equation set out above is obtained in accordance with the reasoning stated in the immediately following paragraph:

Although the recoil-proton energy spectrum is related to the pulse-height distribution, the relationship is nonlinear. If P represents the amplitude of photomultiplier-tube output pulses in units of energy and E represents the energy of the recoil particles which produced the pulses, the two energies are related by:

$$dP/dE = 1/(1 + kB(dE/dx)),$$

where kB is determined experimentally and dE/dx is the energy lost by th recoil particle to the scintillator per unit distance. For recoil electrons, dE/dx is small, and $dP/dE \simeq 1$. Thus, the recoil-electron energy spectrum is directly proportional to the recoil-electron pulse-height distribution. For recoil protons, however, dE/dx is not small and varies with energy. In this case, the solution of equation A1.1 is approximated by $P = \alpha E^\beta$, where $\alpha$ and $\beta$ depend on the scintillation material and are determined experimentally. For a 1.5" diameter $\times$ 1.5"0 high stilbene scintillator, $P = 0.19 E^{1.42}$ is a good approximation where $1 \geq E \geq 15$ MeV.

Once the neutron spectrum has been determined, it is multiplied by another stored array containing energy-dependent neutron tissue-to-kerma-fluence factors. These factors are well known for standard man as well as specific organs and are set out, for example, in Table II on page 93 of Ritts et al. (8). The contribution to the total kerma-rate of the individual energy bins are summed, and the resultant kerma rate (in millirads per hour) is output to the LED display. Finally, the neutron spectrum is converted to an array of 10-bit integers and displayed on the oscilloscope. The spectum and kerma-rate displays persist until the microcomputer is reset.

The microcomputer described herein is thus capable of processing recoil-proton pulse-height distributions in the field. It performs the necessary calculations in less than one second and contributes little to the overall measurement error.

Figure 7:
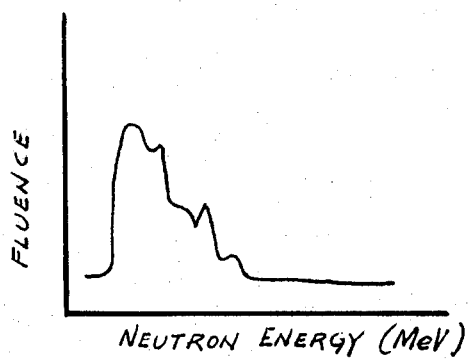
FIG. 7 is a typical test result curve, derived from a PuBe n-γ source, as obtained from the system of FIG. 1.

The instrument was tested a FuBe n-$\gamma$ source, and the results are illustrated in FIG. 7. The tissue kerma rate computed for this data was 1.922 millirads per hour. This value was within 10% of dose rate measurements made at the same distance from the source using an Eberline FN-4 fast neutron counter. FIG. 7 is an anlogue, graph representation of the energy spectrum of neutrons, the relative energy distribution being shown along the x axis, with the relative numbers of neutrons being shown along the y axis.

Potential applications for the system disclosed herein are fast neutron monitoring around reactors, nuclear bomb tests, etc. The system can be readily used to survey neutron radiation in the 0.5 to 20 MeV range, primarily in the presence of a high gamma-ray flux. Currently it is packaged in a 26"$\times$18"$\times$9" suitcase and has a weight of 55 pounds. The flexibility inherent in incorporating a microcomputer will make improvements and additional features simple to implement.

Further details with respect to the above-described system will be found in references (9), (10) and (11). In particular, Daniels (Ref. 9), supra, discusses principally the physics aspects of neutron energy spectra and neutron dose in mixed m-$\gamma$ fields, making reference to illustrations corresponding to FIGS. 1, 2, 3 and 4 in the present application. Silberberg (Ref. 10), supra, contains a detailed disclosure of hardware and software which can be used in providing a particular programmed 8-bit microcomputer which can be used for the computer shown in FIG. 1 and in more detail in FIG. 5, Silberberg (Ref. 11), supra can be considered to be a summary of Silberberg (Ref. 10), supra.

The foregoing description of specific embodiments will so fully reveal the general nature of the invention that others can, by applying current knowledge, readily modify and/or adapt for various applications such specific embodiments without departing from the generic concept of the present invention, and, therefore, such adaptations and modifications should and are intended to be comprehended within the meaning and range of equivalents of the disclosed embodiments. It is to be understood that the phraseology or terminology employed herein is for purposes of description and not of limitation.

What is claimed is:

1. A neutron spectrometer system comprising a photomultiplier tube, radiant energy-responsive scintillator means optically coupled to said photomultiplier tube and respectively generating signal pulses at the anode of the photomultiplier tube and at a dynode of the photomultiplier tube responsive to the reception of radiation including neutrons and gamma rays, pulse shape discrimination circuit means having an energy channel portion and a time channel portion, circuit means connecting said dynode and anode respectively to said energy and time channel portions and having means to analyze the signal pulses and distinguish between pulses induced by neutrons and gamma rays, multichannel analyzer means, means to selectively connect said energy channel portion or said time channel portion to said multichannel analyzer means for selecting pulses according to their amplitudes, said multichannel analyzer means including a first group of channels for neutron-derived pulses and a second group of channels for gamma ray-derived pulses, means to sort the neutron-derived pulses into the first group and the gamma-derived pulses into the second group, means to store the neutron-derived pulses in said first group of channels in a distribution according to their pulse heights, means to store the gamma ray-derived pulses in said second group of channels in a distribution according to their pulse heights, and computer means to convert the pulse height distribution in said first group into a neutron energy spectrum, the storage means including a large area RAM and means to copy the pulse height distributions accumulated in the multichannel analyzer means into said large area RAM using direct memory access.

2. The neutron spectrometer system of claim 1, further comprising a preamp including means to integrate the dynode pulses, said pulse shape discrimination circuit means including double-delay-line means to derive baseline crossover points from said integrated pulses, and means to measure the time difference between the anode current pulses and said crossover points.

3. The neutron spectrometer system of claim 2, and wherein said pulse shape discrimination circuit means includes means to derive a fast rise, low walk timing discrimination pulse from the anode of the photomultiplier tube.

4. The neutron spectrometer system of claim 2, and wherein said scintillator means comprises a stilbene crystal.

5. The neutron spectrometer system of claim 1, and wherein said channels are each arranged to span a selected region of the pulse height spectrum.

6. The neutron spectrometer system of claim 5, and wherein the process of assigning the input pulse heights to said channels is that of analog-to-digital conversion.

7. The neutron spectrometer system of claim 5, and wherein said multichannel analyzer means includes means for recording the number of events classified in each channel, and wherein the plot of the total number of events classified in all the channels is the pulse height histogram of all the pulses in said selected regions.

8. The neutron spectrometer system of claim 7, and wherein said multichannel analyzer means includes a memory for recording the classifications of the pulses in the channels, and wherein each channel has an address in the memory.

9. The neutron spectrometer system of claim 8, and wherein the number of events which have been classified in each channel is stored in a binary code consisting of a predetermined number of bits.

10. The neutron spectrometer system of claim 9, and wherein said multichannel analyzer means is provided with display enabling means and with switch means for controlling said display enabling means, and means for accumulating data in said multichannel analyzer means until either said switch means is actuated or when the maximum count in any one channel reaches a predetermined value.

11. The neutron spectrometer system of claim 10, and means to activate said display enabling means responsive to the maximum count in any one channel reaching said predetermined value.

12. The neutron spectrometer system of claim 1, and wherein said pulse shape discrimination circuit means is of the type utilizing relative differences in the shape of the output pulses of the photomultiplier tube.

13. The neutron spectrometer system of claim 12, and wherein said pulse shape discrimination circuit means comprises means for double differentiating pulse-derived signals and means for determining zero-crossing points of the double-differentiated signals.

14. The neutron spectrometer system of claim 13, including means for integrating the output pulses of the photomultiplier tube, whereby double differentiation of the integrated pulses produces respective baseline crossover points $T_1$, $T_2$ which are amplitude-invariant functions of the respective rise times, and measurement of the time difference between the photomultiplier tube anode current pulses and the crossover points are indicative of the type of particles causing the pulses, the rise times of integrated signals being different for signals produced by gamma rays and those produced by neutrons.

* * * * *